(12) United States Patent
Later et al.

(10) Patent No.: US 10,718,692 B2
(45) Date of Patent: Jul. 21, 2020

(54) BI-DIRECTIONAL VALVELESS SAMPLING PORT FOR USE WITH GAS SAMPLING BAGS

(71) Applicant: AERIS SCIENTIFIC, LLC, Longview, WA (US)

(72) Inventors: Jakob B. Later, Sandy, UT (US); Joseph H. Sanderson, Longview, WA (US); Stephen W. Vincent, Longview, WA (US); Douglas W. Later, Sandy, UT (US)

(73) Assignee: AERIS SCIENTIFIC, LLC, Longview, WA (US)

( * ) Notice: Subject to any disclaimer, the term of this patent is extended or adjusted under 35 U.S.C. 154(b) by 418 days.

(21) Appl. No.: 15/713,683

(22) Filed: Sep. 24, 2017

(65) Prior Publication Data

US 2018/0088009 A1 Mar. 29, 2018

Related U.S. Application Data

(60) Provisional application No. 62/398,836, filed on Sep. 23, 2016.

(51) Int. Cl.
| | | |
|---|---|---|
| *F16L 23/18* | (2006.01) | |
| *G01N 1/22* | (2006.01) | |
| *G01N 1/24* | (2006.01) | |
| *F16L 55/115* | (2006.01) | |

(52) U.S. Cl.
CPC ............... *G01N 1/22* (2013.01); *F16L 23/18* (2013.01); *F16L 55/115* (2013.01); *G01N 1/2273* (2013.01); *G01N 1/24* (2013.01)

(58) Field of Classification Search
CPC ...... G01N 1/10; G01N 1/2202; G01N 1/2214; G01N 1/24; G01N 2001/1037
USPC ........................................................ 73/863.81
See application file for complete search history.

(56) References Cited

U.S. PATENT DOCUMENTS

| | | | | |
|---|---|---|---|---|
| 3,783,920 A | | 1/1974 | Weikert | |
| 4,262,880 A | * | 4/1981 | Danko | F16K 5/0407 251/209 |
| 4,915,356 A | * | 4/1990 | Guild | G01N 30/18 251/340 |
| 5,074,155 A | * | 12/1991 | Vecere | F16L 19/0656 73/864.62 |
| 5,095,765 A | * | 3/1992 | Filbey | G01N 1/2035 73/863.86 |

(Continued)

*Primary Examiner* — Peter J Macchiarolo
*Assistant Examiner* — Mohammed E Keramet-Amircolai
(74) *Attorney, Agent, or Firm* — Morriss O'Bryant Compagni

(57) ABSTRACT

A system and method for providing a bi-directional, valveless sampling port for use with gas sampling bags, wherein the valve-less sampling port has few parts and no moving parts, the sampling port is coupled to a gas sampling bag using a base component that has a portion inside and outside of the gas sampling bag, a cap that is disposed over the base to make an interference fit, an O-ring between the base and the cap that applies a sealing force to hold the gas sampling bag against the base, and a dome seal inside the base and held in place by the cap, wherein the dome seal functions as a one-way check valve to prevent flow out of the gas sampling bag until a sampling adapter is inserted through the cap and the dome seal to provide access to the gas sampling bag for extraction of gas.

15 Claims, 17 Drawing Sheets

(56) References Cited

U.S. PATENT DOCUMENTS

| | | | | |
|---|---|---|---|---|
| 5,456,126 | A * | 10/1995 | Suddath | G01N 1/22 |
| | | | | 73/864.62 |
| 6,055,872 | A * | 5/2000 | Little | G01N 1/22 |
| | | | | 141/68 |
| 6,058,789 | A * | 5/2000 | Kohsaka | G01N 1/2247 |
| | | | | 73/863.11 |
| 6,467,479 | B1 | 10/2002 | Albert et al. | |
| 7,219,874 | B2 * | 5/2007 | Tippett | G01N 1/24 |
| | | | | 141/68 |
| 7,387,216 | B1 | 6/2008 | Smith | |
| 2005/0050967 | A1 * | 3/2005 | Tippett | G01N 1/24 |
| | | | | 73/864.63 |
| 2007/0214899 | A1 * | 9/2007 | Goodwin | C12M 23/14 |
| | | | | 73/863 |
| 2007/0297700 | A1 | 12/2007 | Berman | |
| 2011/0126643 | A1 * | 6/2011 | Zhang | G01N 1/24 |
| | | | | 73/863.11 |
| 2014/0311617 | A1 | 10/2014 | Py | |

* cited by examiner

BI-DIRECTIONAL VALVELESS SAMPLING PORT FOR USE WITH GAS SAMPLING BAGS

BACKGROUND OF THE INVENTION

Field of the Invention

This invention relates generally to valves used with gas sampling bags that hold gas samples for analytical measurement procedures. More specifically, the invention relates to an improved sampling port having a valve-less design that is more economical to manufacture and easier to use.

Description of Related Art

Gas sampling bags are containers used to collect air samples that are used for analytical measurement procedures. Gas sampling bags may be constructed from various materials which may differ in terms of stability characteristics and cleanliness.

Typical air sampling bags of the prior art include those comprised of polyvinyl fluoride film such as TEDLAR™, or any other suitable material that may provide resistance to rupture and leakage, may be chemically inert, and have low permeability to provide good stability for low molecular weight compounds. A typical prior art gas sampling bag 10 having a prior art valve 8 and attached sampling pump 12 using flexible tubing 14 are shown in FIG. 1.

Gas sampling bags typically include a mechanical valve that must be actuated through a turning or twisting motion of the valve that enables filling the bag and for retrieving samples therefrom. Gas sample collection typically requires a pressurized sampling port or a low flow rate pump. The gas sampling bag typically expands as the gas sample is inserted, and contracts when the gas sample is extracted. When the target volume of the gas sample is collected, a mechanical valve is closed and the gas sample bag may be returned to a laboratory for analysis of the gas.

FIG. 2 is provided as an example of mechanical valves 16, 18 that are used in the prior art to control access to a gas sampling bag. The mechanical valves 16, 18 are first shown in exploded views that illustrate that the mechanical valves are typically assembled using nuts, bolts and washer components. FIG. 2 also shows the assembled mechanical valves 16, 18 that are now attached to a gas sampling bag 20.

FIG. 3 is provided as another prior art mechanical valve 22 that requires actuation of a valve in order to enable access to a gas sampling bag.

FIGS. 2 and 3 illustrate that some prior art mechanical valves have drawbacks that may not be obvious to the observer. However, these drawbacks become evident through use. These disadvantages may include, but should not be considered as limited to, the mechanical valves having a significant number of parts that add to the cost, the mechanical valves having a high profile design that is subject to being knocked or damaged because of its size and resulting in either the breaking of the valve or a tear in the gas sampling bag, the mechanical valve having moving parts that are subject to breaking, and the mechanical valve having a valve component that is subject to leaking.

It would therefore, be an improvement over the prior art to provide a sampling port for a gas sampling bag that has a valve-less design so it is less likely to suffer from gas sample leakage, has fewer components that are less like to break, has components that are less complex and therefore cost less, and has a low-profile design that is less likely to suffer damage during handling and transport.

BRIEF SUMMARY OF THE INVENTION

In a first embodiment, the present invention is a system and method for providing a bi-directional, valve-less sampling port for use with gas sampling bags, wherein the valve-less sampling port has few parts and no moving parts, the sampling port is coupled to a gas sampling bag using a base component that has a portion inside and outside of the gas sampling bag, a cap that is disposed over the base to make an interference fit, an O-ring between the base and the cap that applies a sealing force to hold the gas sampling bag against the base, and a dome seal inside the base and held in place by the cap, wherein the dome seal functions as a one-way check valve to prevent flow out of the gas sampling bag until a sampling adapter is inserted through the cap and the dome seal to provide access to the gas sampling bag for extraction of gas.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed to enable one skilled in the art to make and use the invention. It is to be understood that the following description is only exemplary of the principles of the present invention, and should not be viewed as narrowing the claims which follow.

Figure 4:
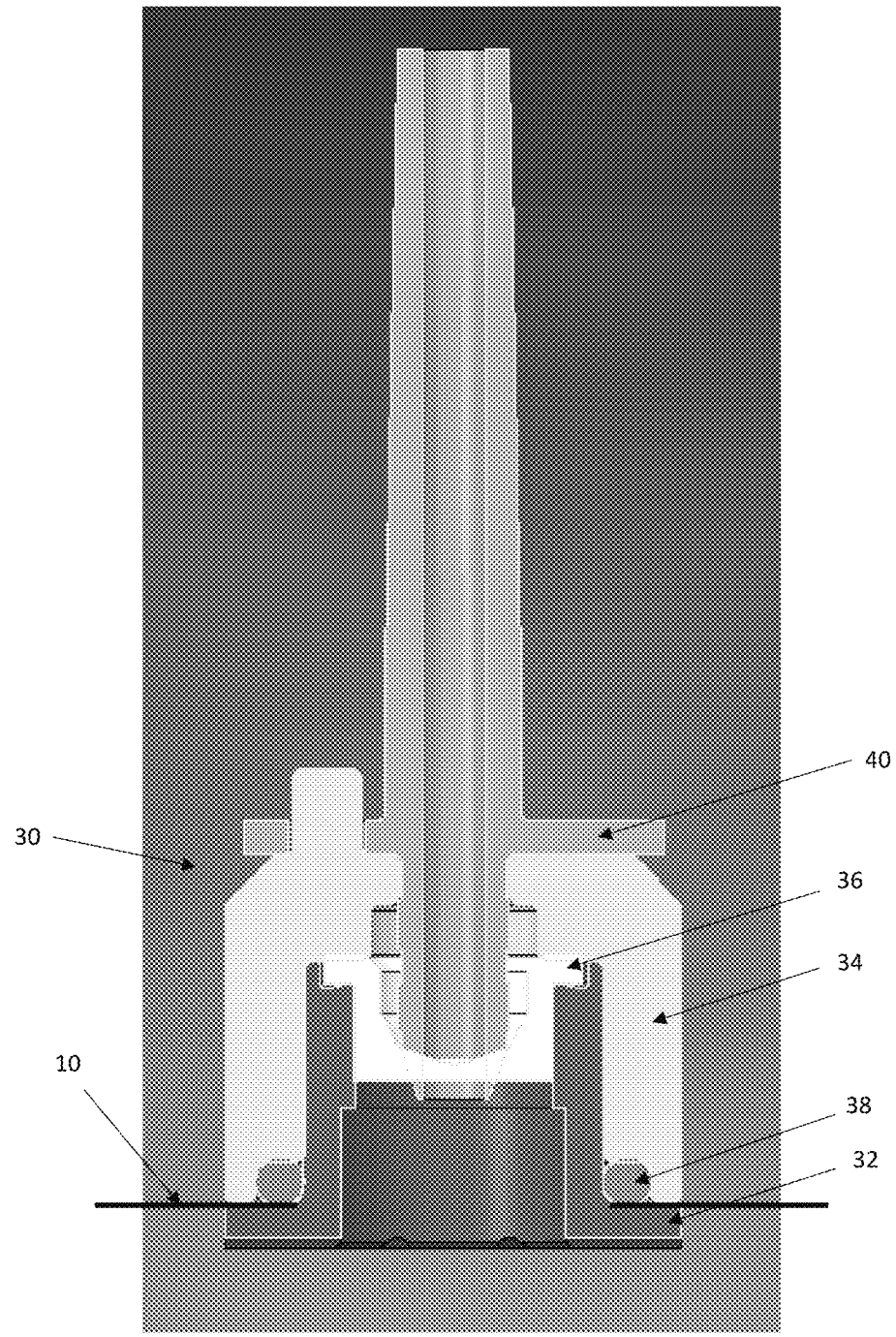
FIG. 4 is a cross-sectional profile view of a first embodiment of an assembled sampling port, a sampling adapter and a portion of the gas sampling bag, wherein the sampling port is comprised of a bi-directional valve-less sampling port.

FIG. 4 is a cross-sectional profile view of a first embodiment of an assembled sampling port 30, a sampling adapter 40 and a single wall of the gas sampling bag 10, wherein the sampling port is comprised of a bi-directional valve-less sampling port (hereinafter, the "valve-less sampling port"). The first embodiment may be comprised of four components, not including the sampling adapter 40 which enables access to the contents of a gas sampling bag 10.

The four main components of the valve-less sampling port 30 may include a base member 32, a cap member 34, a dome seal 36, and an O-ring 38. The manner in which the four components are connected to each other and function as a valve-less sampling port are critical to the first embodiment of the invention. Accordingly, each component will be described hereinafter and the functions explained.

Figure 5:
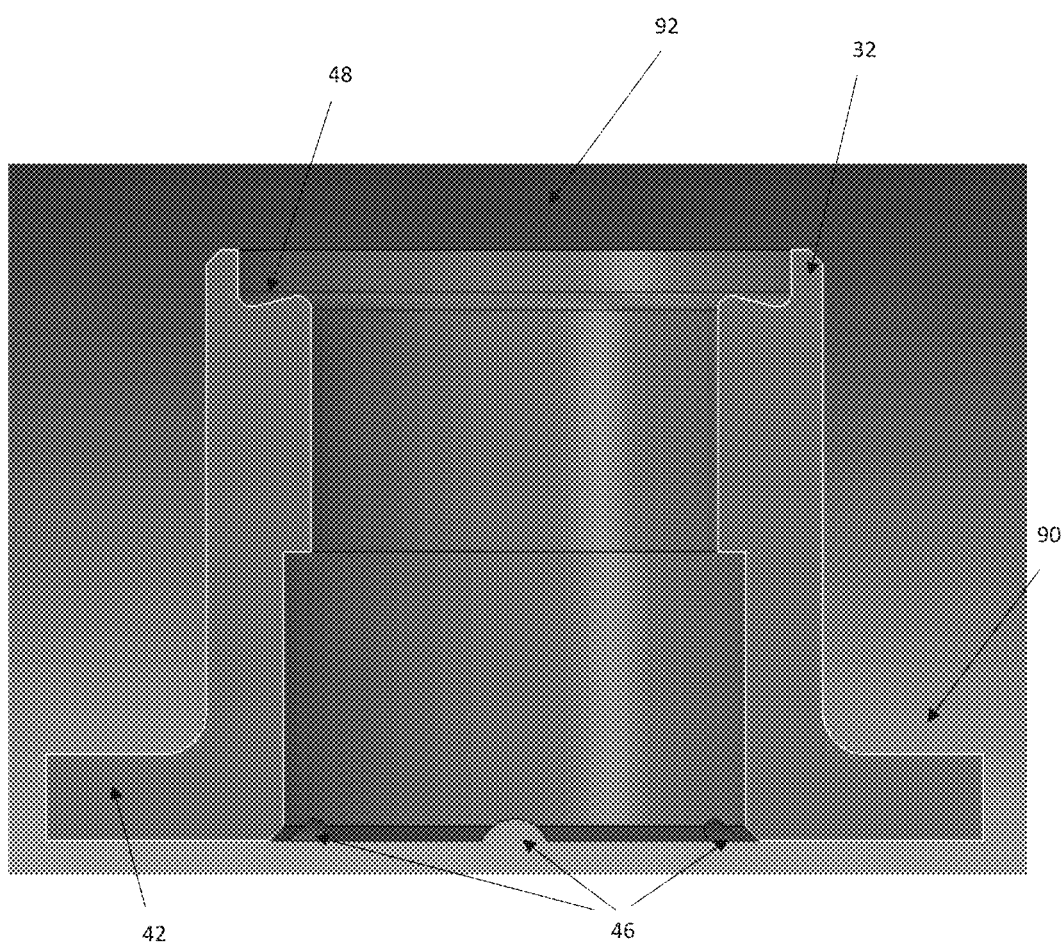
FIG. 5 is a cross-sectional profile view of the base member in the first embodiment of the invention.

FIG. 5 is a cross-sectional profile view of the base member 32 in the first embodiment of the invention. The base member 32 may be a hollow cylinder and may be defined as having a first end 90 that has a base flange 42, and a second end 92. The base flange 42 provides a top surface on which the gas sampling bag may rest when the valve-less sampling port is attached to the gas sampling bag. For example, an aperture in a single wall of a gas sampling bag may be lowered over the base member 32 moving from the second end 92 towards the first end 90 to rest on the top surface of the base flange 42.

Figure 6:
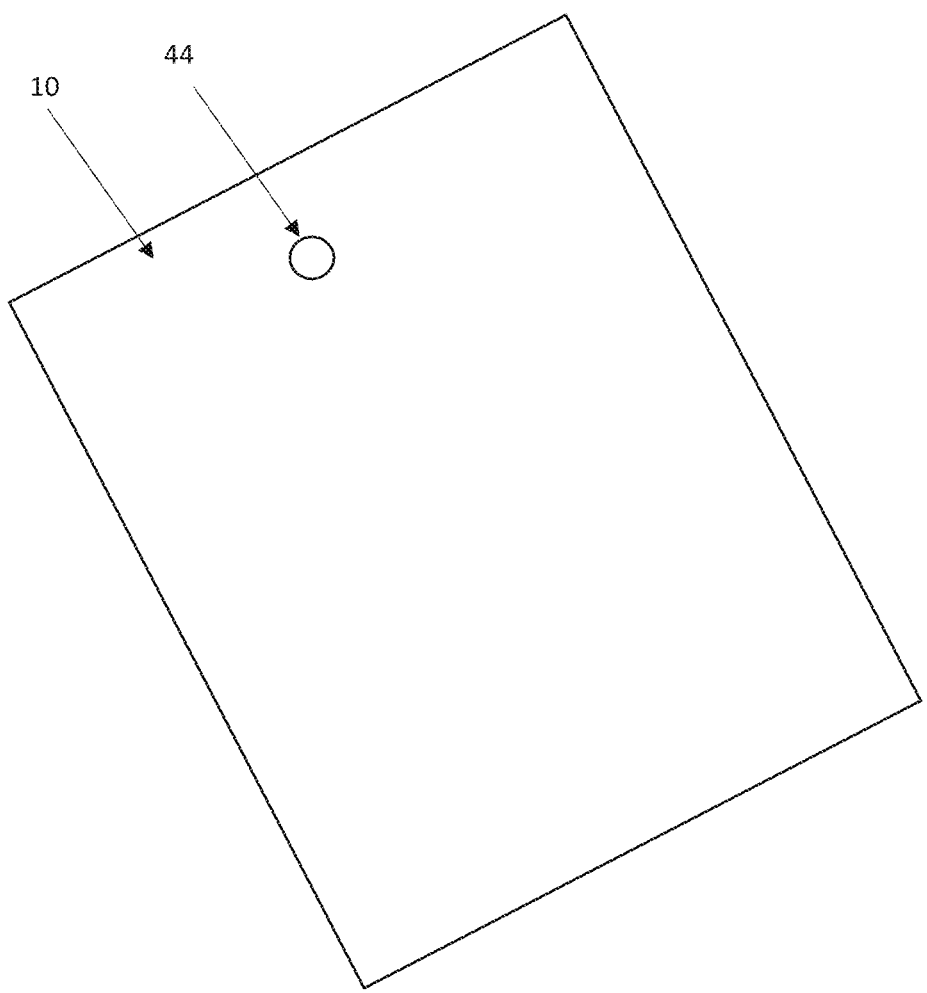
FIG. 6 is a top view of a flat and empty gas sampling bag having a hole through one wall thereof.

As shown in FIG. 6, consider a flat and empty gas sampling bag 10 having a bag aperture 44 through one wall of the gas sampling bag. The bag aperture 44 should fit over the cylindrical body of the base member 32 from the second end 92 and down to the first end 90 until it reaches and rests on the base flange 42. The bag aperture 44 should not be substantially larger than the outer diameter of the base member 32 so that a tight seal may be formed between the valve-less sampling port 30 and the gas sampling bag 10 as will be described.

It is noted that the exact position of the bag aperture 44 in one wall of the gas sampling bag 10 is not a material aspect of the first embodiment, and so it may be positioned wherever it is convenient, including at an end and on a fold of the gas sampling bag. The representation of the gas sampling bag 10 and the bag aperture 44 are for illustration purposes only and are not limiting of the first embodiment of the invention.

Returning to FIG. 5, another feature of the base member 32 is at least one recessed groove or channel 46 on a bottom surface of the base flange 42 that is normally inside the gas sampling bag 10. A plurality of recessed channels 46 are shown in FIG. 5, but there may be as few as one channel 46. The function of the recessed channels 46 is to prevent the collapsing gas sampling bag 10 from sealing off the base member 32 as a gas sample is retrieved from the gas sampling bag.

For example, if the gas sampling bag 10 were to be pressed against the bottom surface of the base flange 42 of the base member 32, the gas sampling bag 10 could act as a seal and prevent the gas from escaping through the hollow base member. The recessed channels 46 would prevent the gas sampling bag 10 from acting as a seal.

Another feature of the base member 32 is at the second end 92. The second end 92 may have a recessed lip 48 on an inside diameter of the base member 32 for supporting a circular object within the hollow interior of the base member. The recessed lip 48 may circumscribe the entire inner diameter of the base member 32.

Figure 7:
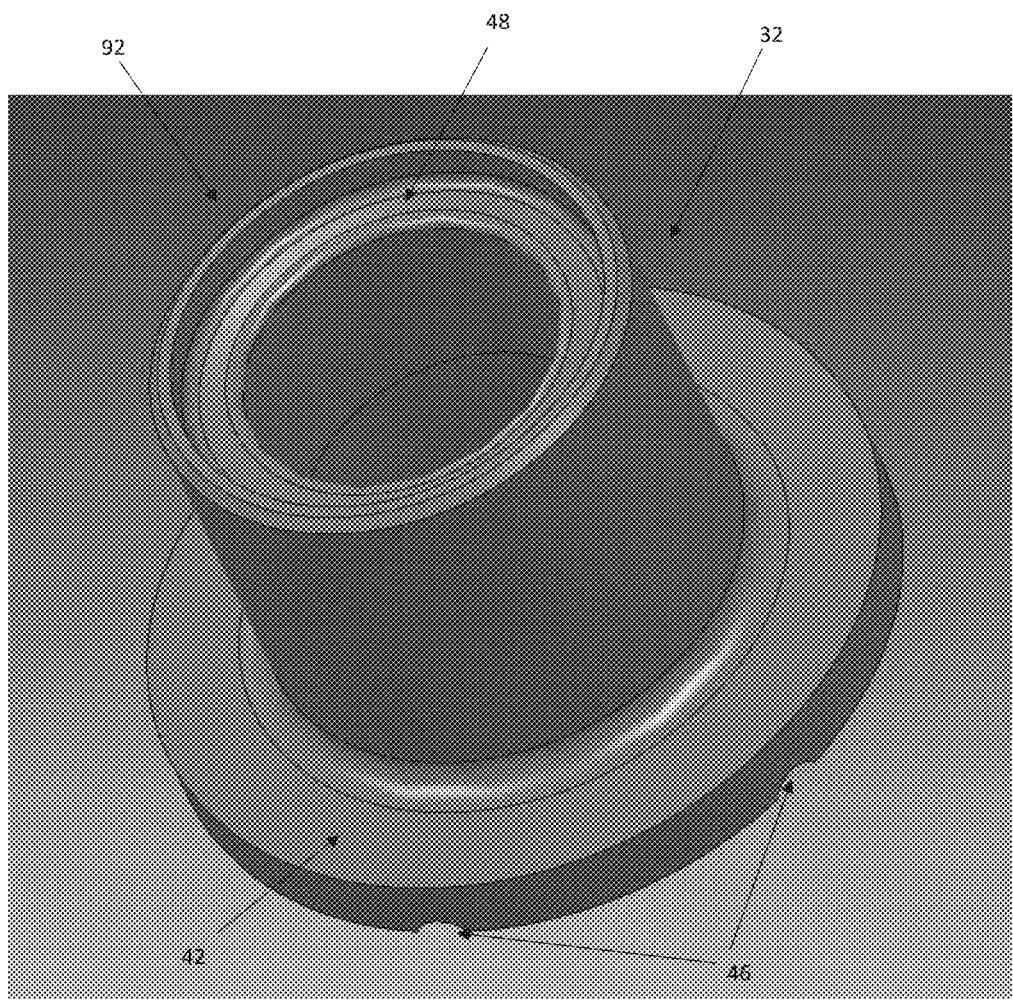
FIG. 7 is a perspective view of the base member from above the second end.

FIG. 7 is a perspective view of the base member 32 from above the second end 92 and is shown for illustration purposes only. A portion of the recessed channels 46 are only visible at the edge of the base flange 42 because they are located on the bottom of the base member 32 and at the first end 90. Also visible is the recessed lip 48 at the second end 92 of the base member 32.

In the first embodiment of the invention, the base member 32 is manufactured from a plastic. For example, it may be manufactured from polypropylene or any similar thermoplastic polymer. However, the base member 32 may be manufactured from other materials having similar properties as will be described.

Figure 8:
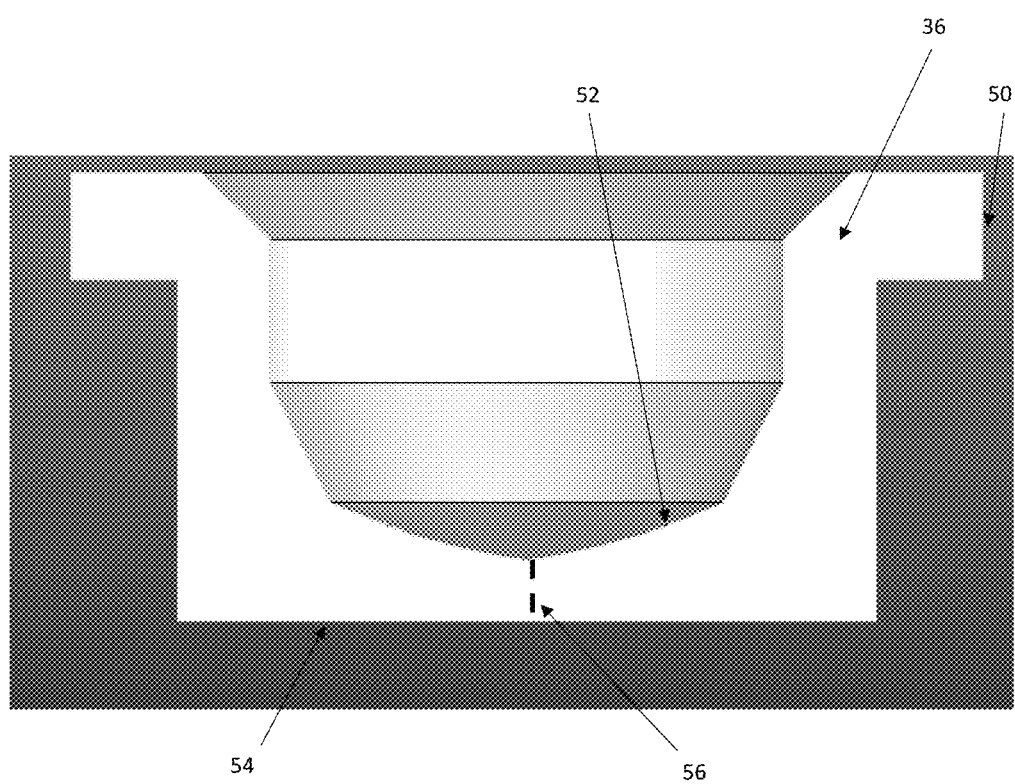
FIG. 8 is a cross-sectional profile view of the dome seal in the first embodiment of the invention.

Another component of the valve-less sampling port 30 is the dome seal 36 as shown in FIG. 8. FIG. 8 is a cross-sectional profile view of the dome seal 36 having a hollow interior. The dome seal 36 may be a compressible material and may have a circular outer edge 50 that has a shape that is adapted to fit within the recessed lip 48 of the base member 32.

The dome seal 36 may also include a dome having an inner concave surface 52 and an outer surface 54 with a dome aperture 56 represented as being a slit that is located by the dotted line 56 and perpendicular to the page, through a center of a top of the dome seal, the dome aperture being normally closed unless a force is applied from the inner concave surface towards the outer surface, and which forms a one-way gate. The one-way dome aperture 56 is the port through which the sampling adapter 40 or any object that is penetrating the valve-less sampling port 30 may be pushed.

Regardless of the exact position of the dome aperture 56 in the dome seal 38, what is important is that the bag aperture provides a one-way check valve that is not a valve with moving parts, and which requires a force to be applied to it to cause it open and allow an object to penetrate it and access the interior of the gas sampling bag. When no force is being applied from the concave side of the dome seal 38, the dome aperture 56 is normally closed, and only when a force is applied from the concave side does the dome aperture open to allow access.

It should be understood from FIG. 4 that in the first embodiment, the dome seal 36 may not fit entirely within the hollow body of the base member 32 but is slightly above the second end 92 of the base member. By positioning the dome seal 36 slightly above the base member 32, the compressive force of the cap member 34 applies a force that creates an airtight seal between the base member, the cap member and the dome seal.

The actual size of the normally closed dome aperture 56 may be manufactured to be any suitable size that will enable the sampling adapter 40 to be inserted through the dome seal 36 as shown in FIG. 4 to reach the gas inside the gas sampling bag 10.

Figure 9:
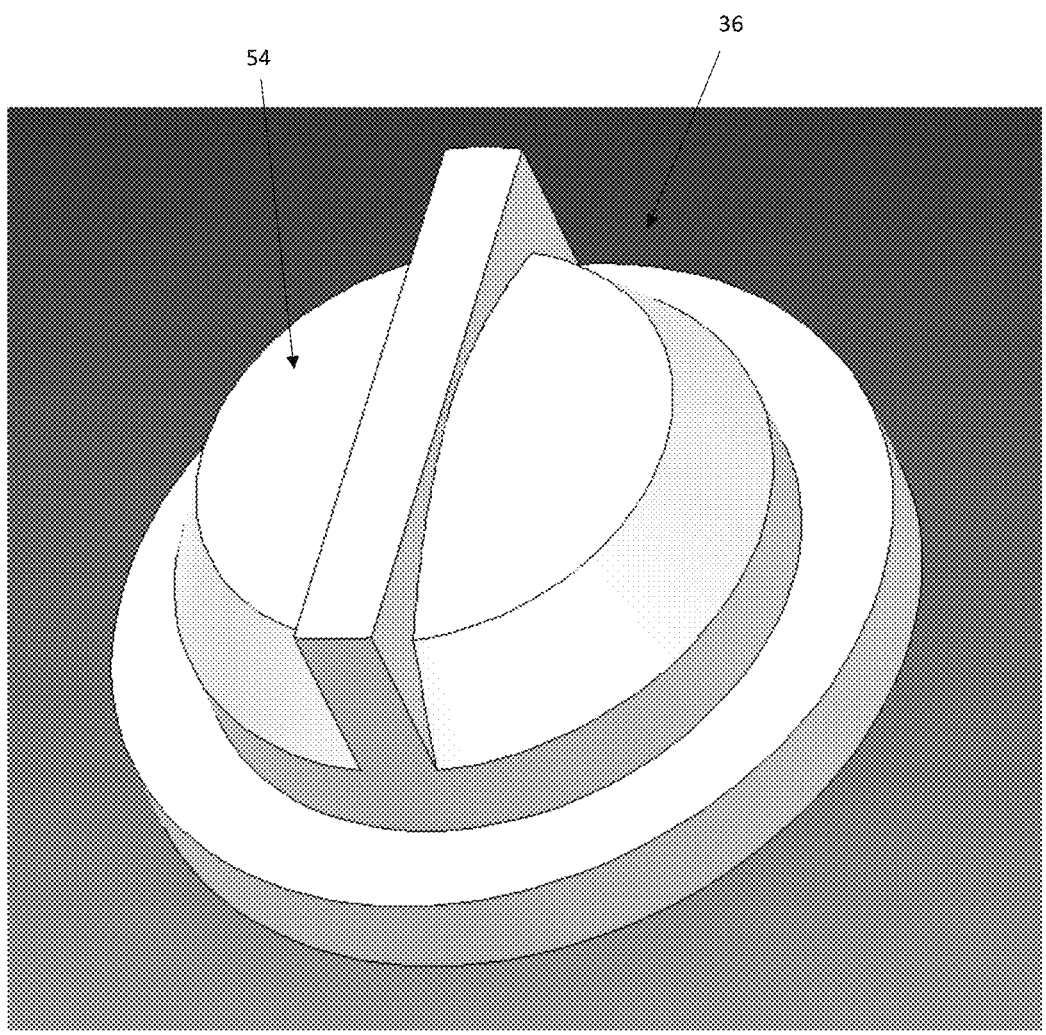
FIG. 9 is a perspective illustration of the dome seal as seen from above the outer surface.

FIG. 9 is a perspective illustration of the dome seal 36 as seen from above the outer surface 54. This outer surface 54 may be disposed inside the second end 92 while the circular outer edge 50 rests on the recessed lip 48 of the base member 32 and extend towards the first end 90 of the base member.

Figure 10:
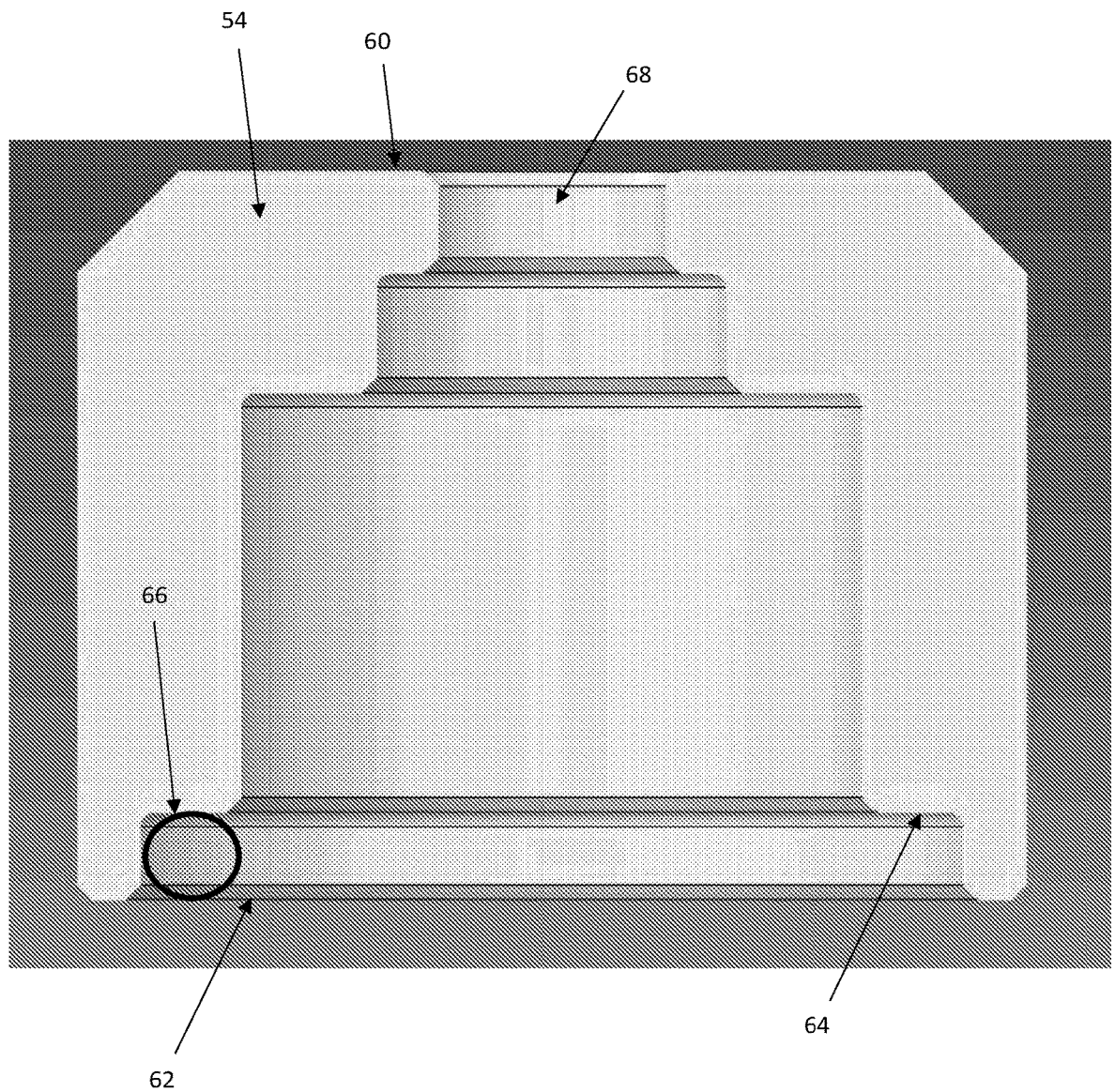
FIG. 10 is a cross-sectional profile view of the cap member in the first embodiment of the invention.

Another component of the valve-less sampling port 30 is the cap member 34 as shown in FIG. 10. FIG. 10 is a cross-sectional profile view of the cap member 34. The cap member 34 may be formed having a cylindrical shape and having a port end 60 and an open end 62 and formed so as to fit over the second end of the base member 32. The cap member 34 is manufactured to form an interference fit over the base member 32. The open end 62 may make contact with the base flange 42 of the base member 32 unless the gas sampling bag 10 is disposed over the base member when the valve-less sampling port is in use with a gas sampling bag.

One aspect of the cap member 34 is a recessed lip 64 in the inner diameter of the open end 62. The recessed lip 64 forms a gap 66 as indicated by the circle that is shown between the open end 62 of the cap member 34 and the base member 32. This gap 66 may be filled by the fourth component of the valve-less sampling port 30.

Another aspect of the cap member 34 in the first embodiment of the invention is a cap aperture 68 disposed through the middle of the port end 60 of the cap member. The cap aperture 68 is used to insert the sampling adapter 40 into the gas sampling bag for extracting a sample for analysis as shown in FIG. 4. Therefore, the cap aperture 68 of the cap member 34 must be aligned with the normally closed dome aperture 56 in the dome seal 36.

Figure 11:
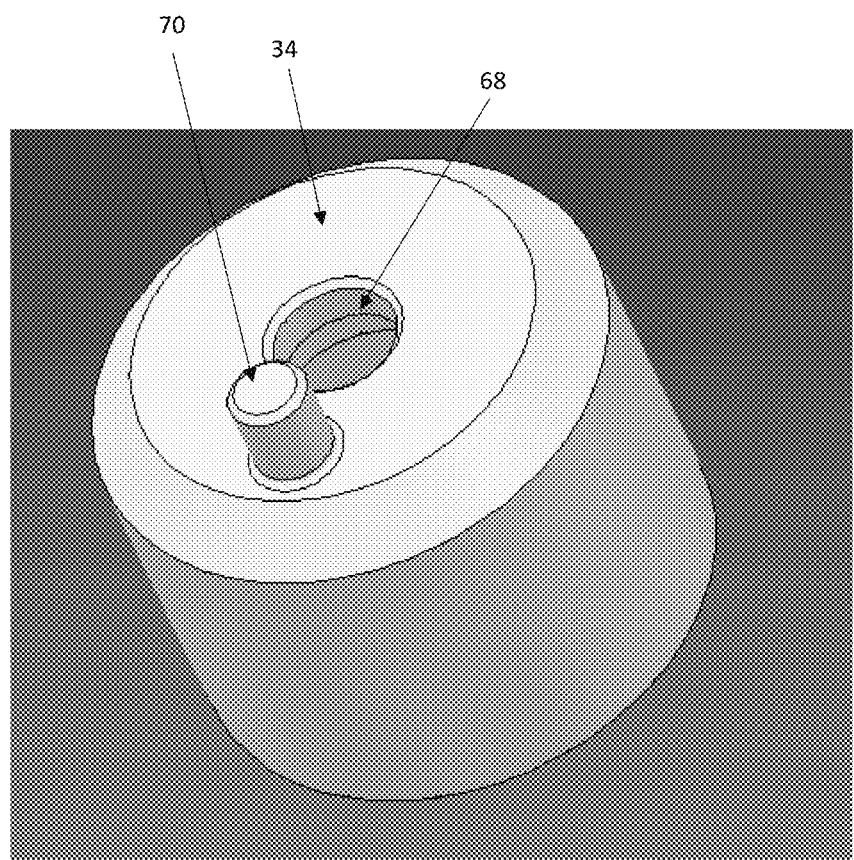
FIG. 11 is a perspective view of a post disposed offset from the cap aperture through the port end of the cap member.

Another aspect of the cap member 34 in the first embodiment of the invention is shown in FIG. 11. FIG. 11 shows a perspective view of a post 70 disposed offset from the cap aperture 68 through the port end 60 of the cap member 34. The post 70 is used to prevent the sampling adapter 40 from being inserted into the valve-less sampling port 30 until a hole in the sampling adapter is aligned with the post 70 as will be shown when describing the sampling adapter.

Figure 12:
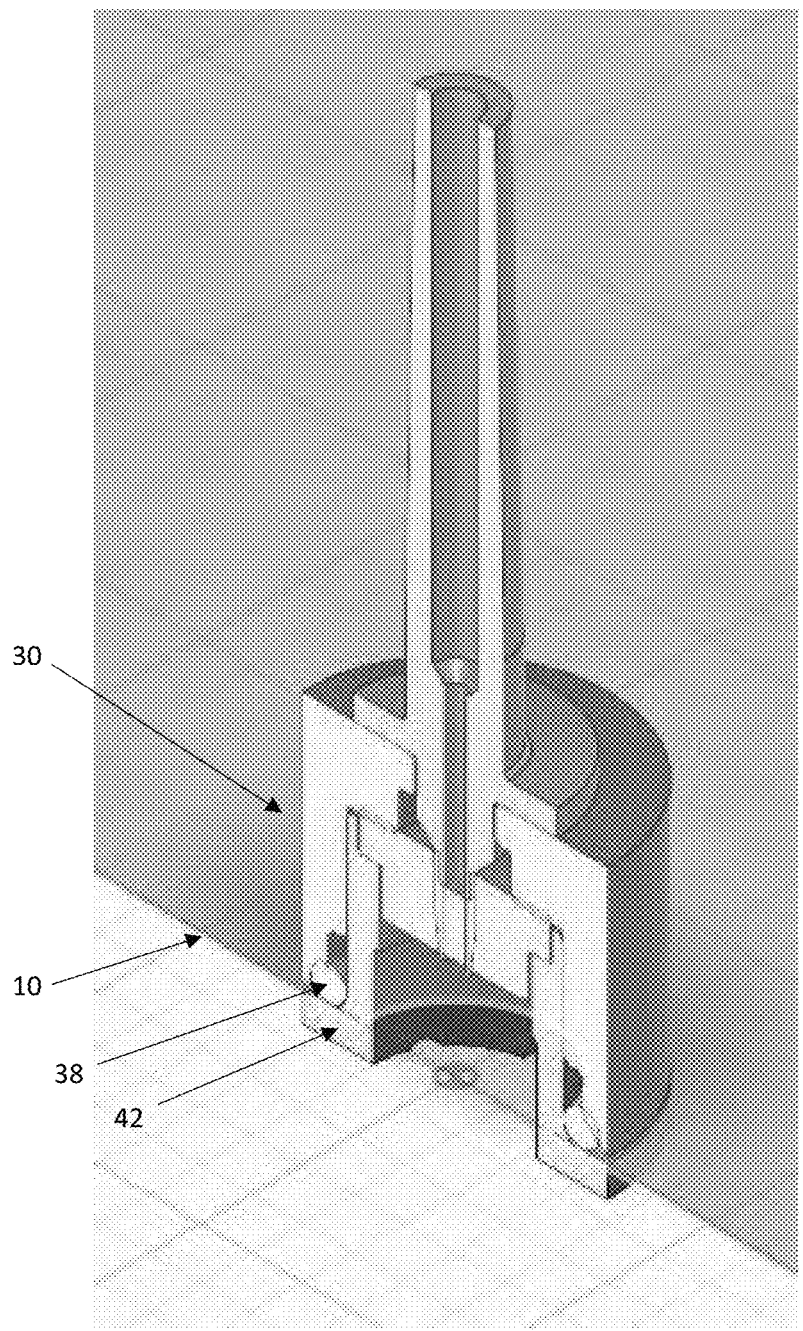
FIG. 12 is a perspective view of the valve-less sampling port and the attached sampling adapter attached to a wall of a gas sampling bag.

Another component of the valve-less sampling port 30 is the O-ring 38 as shown in FIG. 12. FIG. 4 is a cross-sectional profile view of a first embodiment of the assembled valve-less sampling port 30 and the sampling adapter 40. The O-ring 38 is also shown having a circular cross-section, and may be formed as a toroidal shape. As shown in FIGS. 10 and 12, the O-ring 38 may be disposed within the gap 66 of the recessed lip 64 of the cap member 34.

The O-ring 38 may be comprised of any material that is compressible, such as rubber or a rubber-like material. The O-ring 38 may be compressible so that when the cap member 34 is pressed against the base member 32 forming an interference fit, the cap member is applying a force against both the dome seal 36 and the O-ring 38 to thereby create an airtight seal to thereby prevent the leakage of any gas within the gas sampling bag 10 through any components of the valve-less sampling port.

The function of the O-ring 38 is to act as an airtight seal between the base flange 42 of the base member 32 that is inside the gas sampling bag 10, and cap member 34 that is on the outside of the gas sampling bag. As shown in FIG. 12, the gas sampling bag 10 is disposed between the base flange 42 and the O-ring 38. The open end 62 of the cap member 34 may also make contact with the gas sampling bag 10, but this contact may only be incidental. This potential contact between the open end 62 of the cap member 34 and the gas sampling bag 10 is shown in FIG. 12. What is more important is that the O-ring 38 make contact and create the desired seal. Accordingly, the O-ring 38 may be slightly larger than the gap 66 so that the O-ring is fully engaged with the gas sampling bag.

Figure 13:
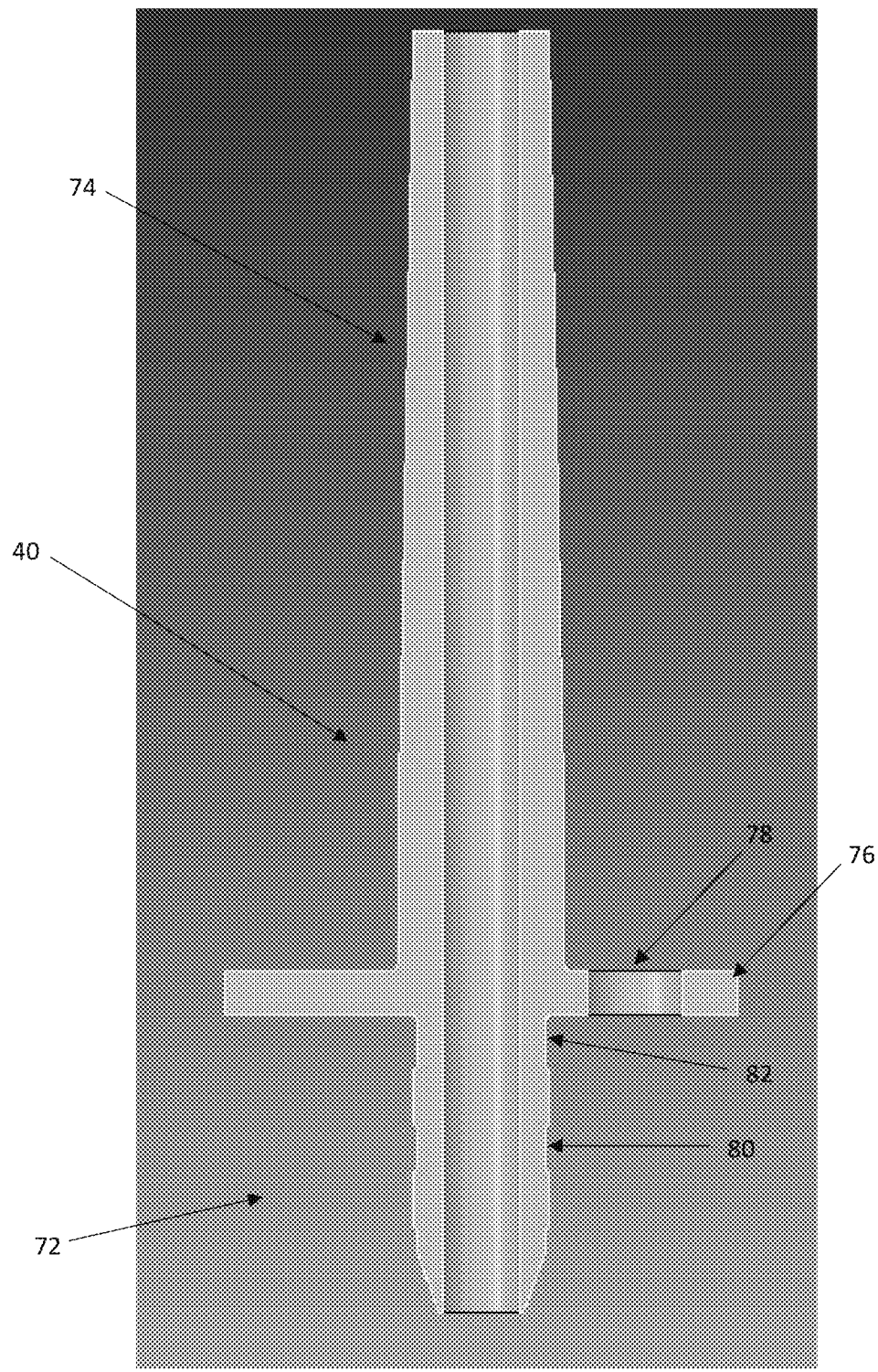
FIG. 13 is a cross-sectional view of the sampling adapter in the first embodiment of the invention.

An object that may be used with the valve-less sampling port 30 to provide a means for introducing a gas sample into and retrieving a gas sample from the gas sampling bag 10 is the sampling adapter 40 shown in FIG. 4 and in FIG. 13.

Figure 1:
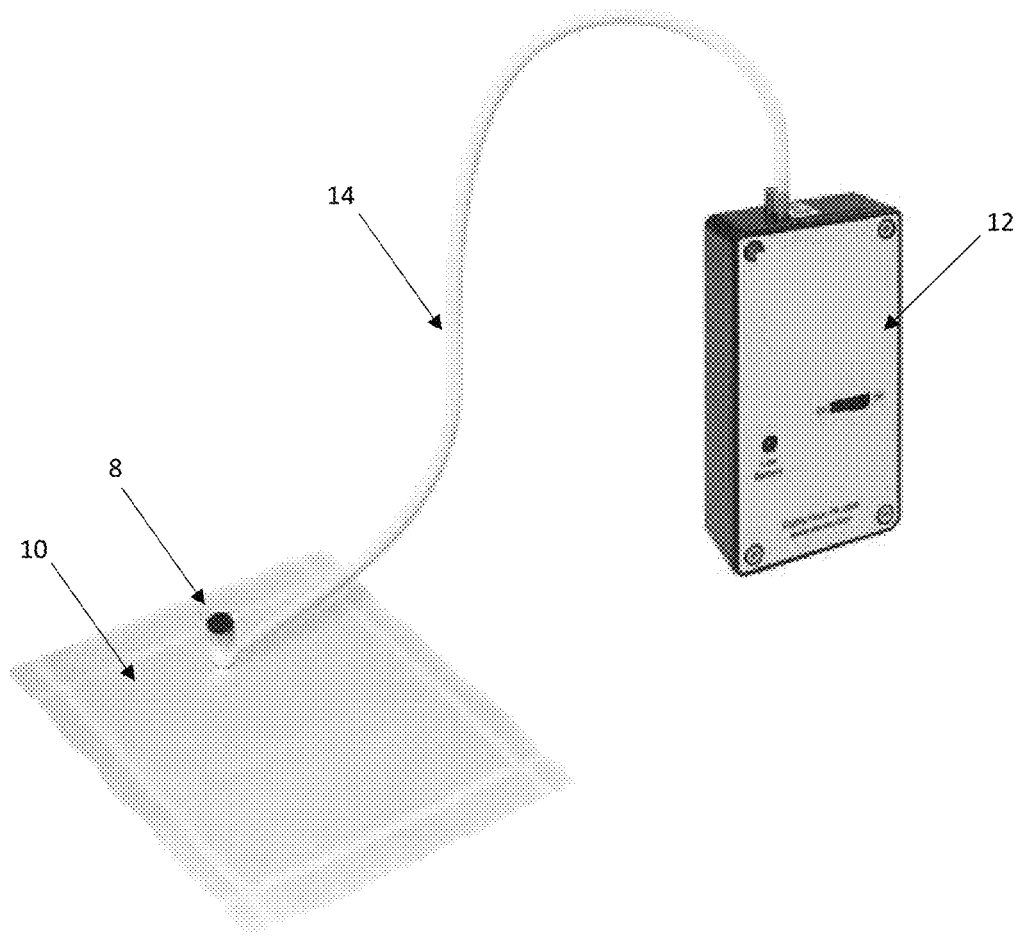
FIG. 1 is a prior art illustration of a gas sampling bag, prior art valve, a pump and a hose disposed between the valve and the pump.
Figure 2:
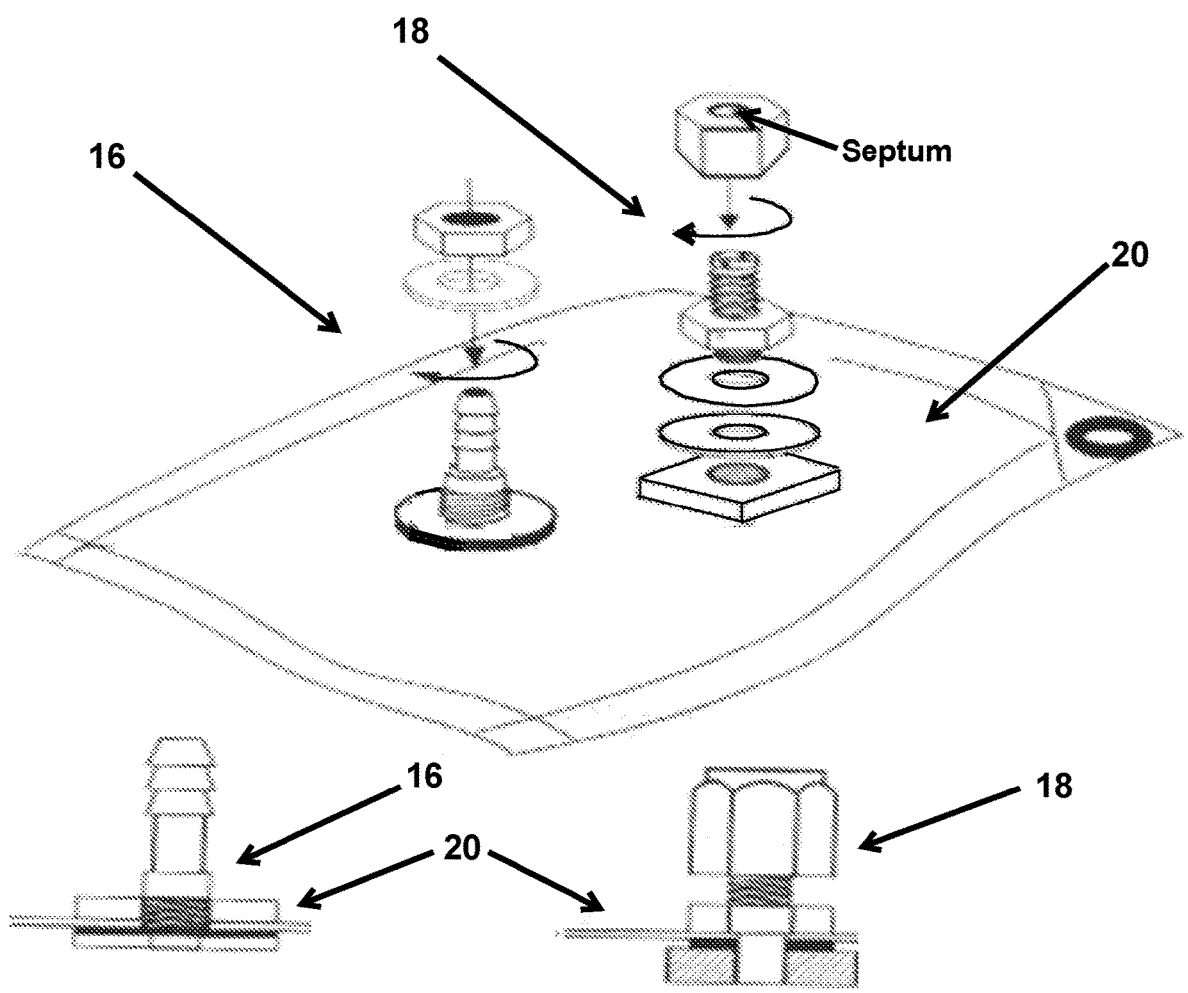
FIG. 2 is a perspective exploded view of two prior art mechanical valves that show the various components, and an assembled view of the two mechanical valves showing how they are attached to a gas sampling bag.
Figure 3:
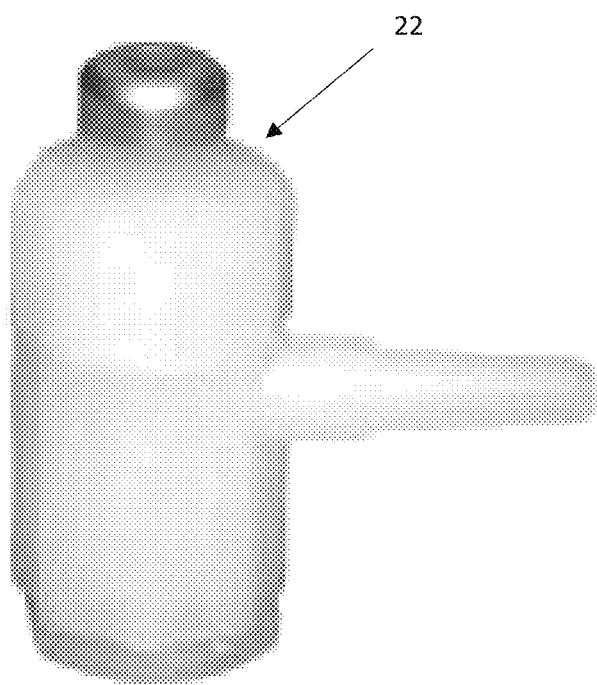
FIG. 3 is a perspective view of a third prior art mechanical valve.

FIG. 13 is a cross-sectional profile view of the sampling adapter 40. The sampling adapter 40 is a hollow tube that may be comprised of an insertion end 72 and a coupling end 74, and having an adapter flange 76 disposed along a length thereof. The insertion end 72 may be inserted through the cap aperture 68 in the cap member 34, while the coupling end 74 may have a tapered fitting to enable flexible tubing to be attached, for example, between the valve 8 in the gas sampling bag 10 and a sampling pump 12 as shown in FIG. 1. In the first embodiment, the coupling end 74 may also function as a syringe guide when a sampling syringe is used to extract a gas sample from a gas sampling bag.

It is noted that the valve-less sampling port of the first embodiment does not require a septum as is required by all other valves in the prior art that provide needle access to the contents of a gas sampling bag. The first embodiment may provide access through the dome seal for any syringe.

The adapter flange 76 may function as a depth stop to prevent the sampling adapter 40 from being inserted too far into the dome seal 38, but also provides a flange alignment aperture 78. The flange alignment aperture 78 only allows the sampling adapter 40 to be inserted properly into the valve-less sampling port 30 for gas sample extraction when the flange alignment aperture is aligned with the post 70 of the cap member 34.

In the first embodiment of the sampling adapter 40, the insertion end may include two offset annular snap joints disposed along an axis of the insertion end 72 that enable the sampling adapter 40 to stop at two insertion points 80, 82.

Figure 14:
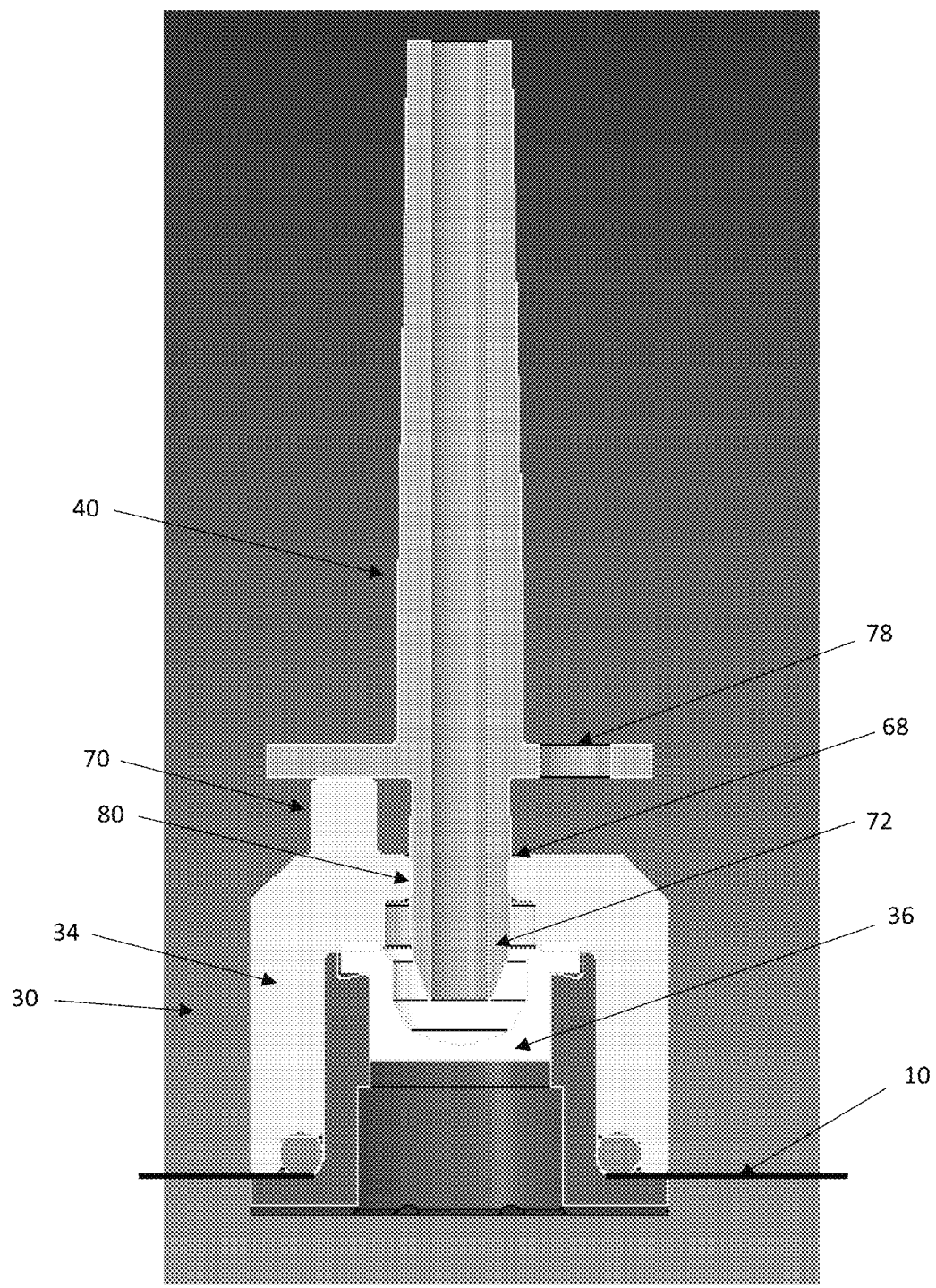
FIG. 14 is a cross-sectional profile view of the valve-less sampling port, the sampling adapter and a portion of the gas sampling bag, wherein the sampling adapter is inserted partway into the valve-less sampling port.

FIG. 14 is a cross-sectional profile view of the valve-less sampling port 30, the sampling adapter 40 and a wall of the gas sampling bag 10, wherein the sampling adapter is inserted into the valve-less sampling port to a first insertion point 80. Note that the sampling adapter 40 is being held by the cap member 34 at the cap aperture 68. It is also observed that the post 70 is preventing the sampling adapter 40 from moving past the first insertion point 80 because the post is not aligned with the flange alignment aperture 78. There is a gap between the insertion end 72 and the dome seal 36, so there is no penetration of the dome seal by the sampling adapter 40 and no gas extraction may take place from the gas sampling bag 10.

Figure 15:
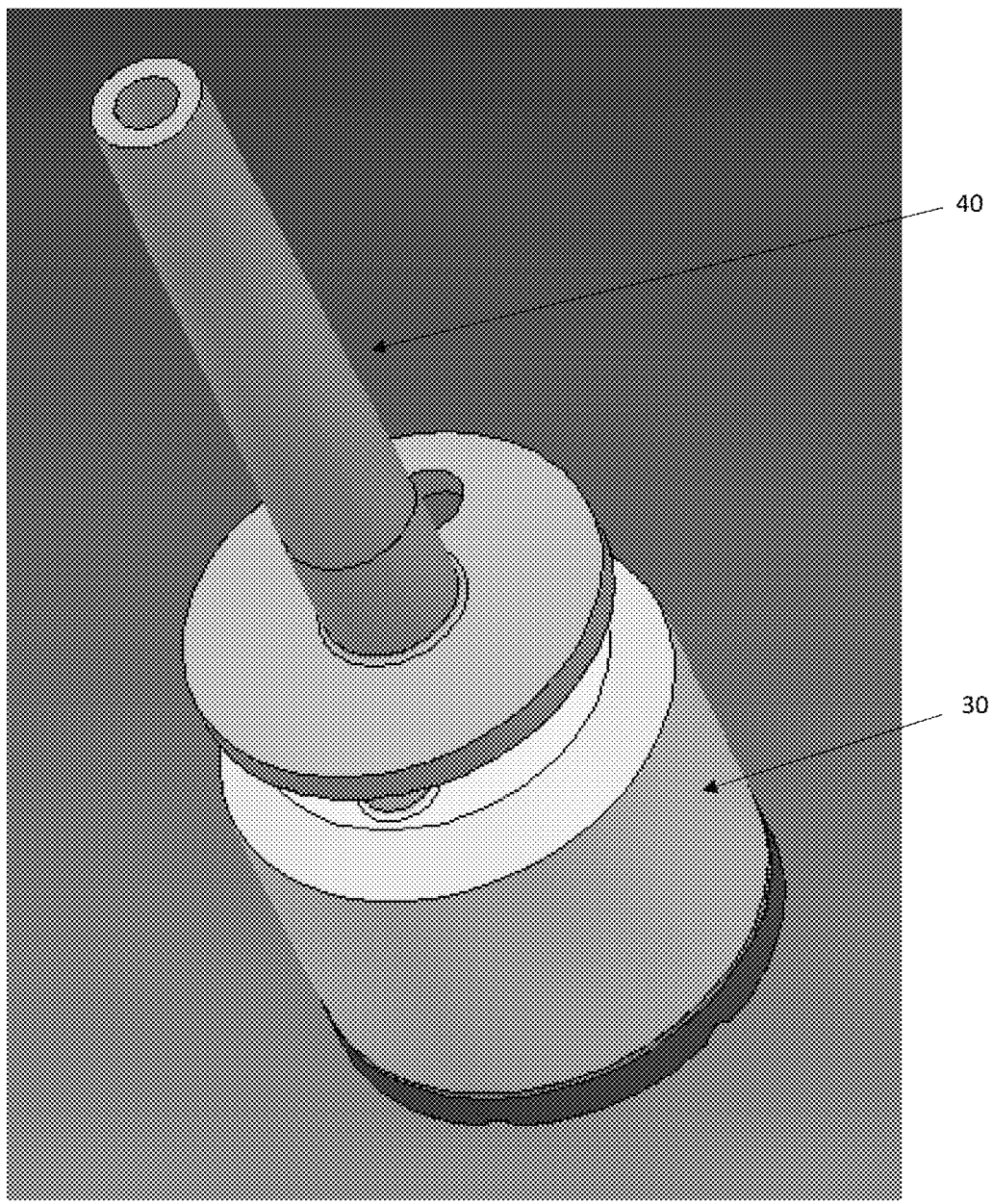
FIG. 15 is a perspective view of the valve-less sampling port and the sampling adapter shown in FIG. 14.

FIG. 15 is a perspective view of the valve-less sampling port 30 and the sampling adapter 40 shown in FIG. 14.

Figure 16:
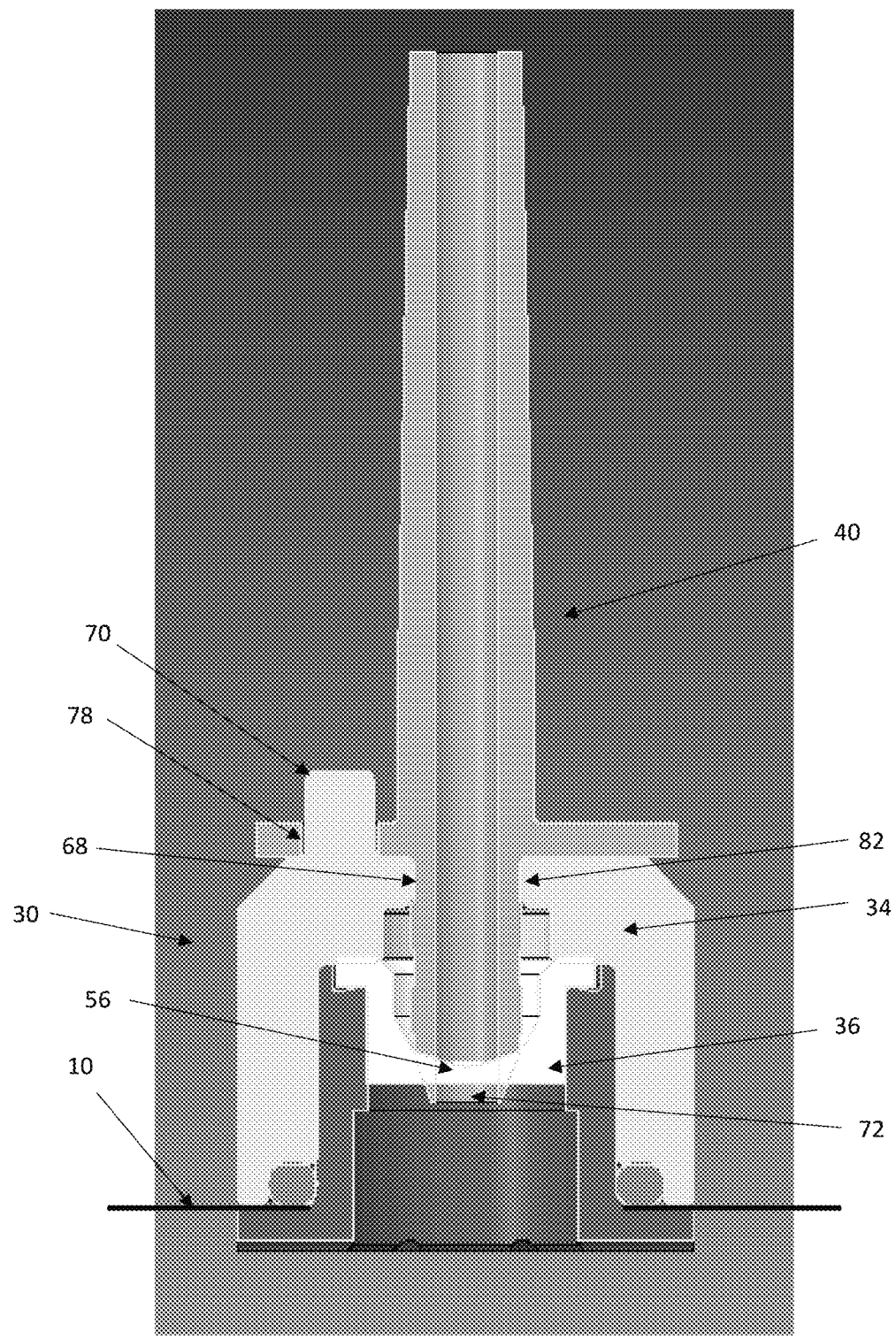
FIG. 16 is a cross-sectional profile view of the valve-less sampling port, the sampling adapter and a portion of the gas sampling bag, wherein the sampling adapter is inserted all the way into the valve-less sampling port.

FIG. 16 is a cross-sectional profile view of the valve-less sampling port 30 and the sampling adapter 40, wherein the sampling adapter is inserted into the valve-less sampling port to the second insertion point 82. The sampling adapter 40 has been rotated to align the flange alignment aperture 78 with the post 70, enabling the sampling adapter to be inserted past the first insertion point 80 and to the second insertion point 82. Consequently, the insertion end 72 has now penetrated the dome aperture 56 of the dome seal 36. It should be observed that the cap aperture 68 of the cap member 34 is holding the sampling adapter 40 in place so that it is safe to perform gas extraction without concern that the sampling adapter will be moved.

Figure 17:
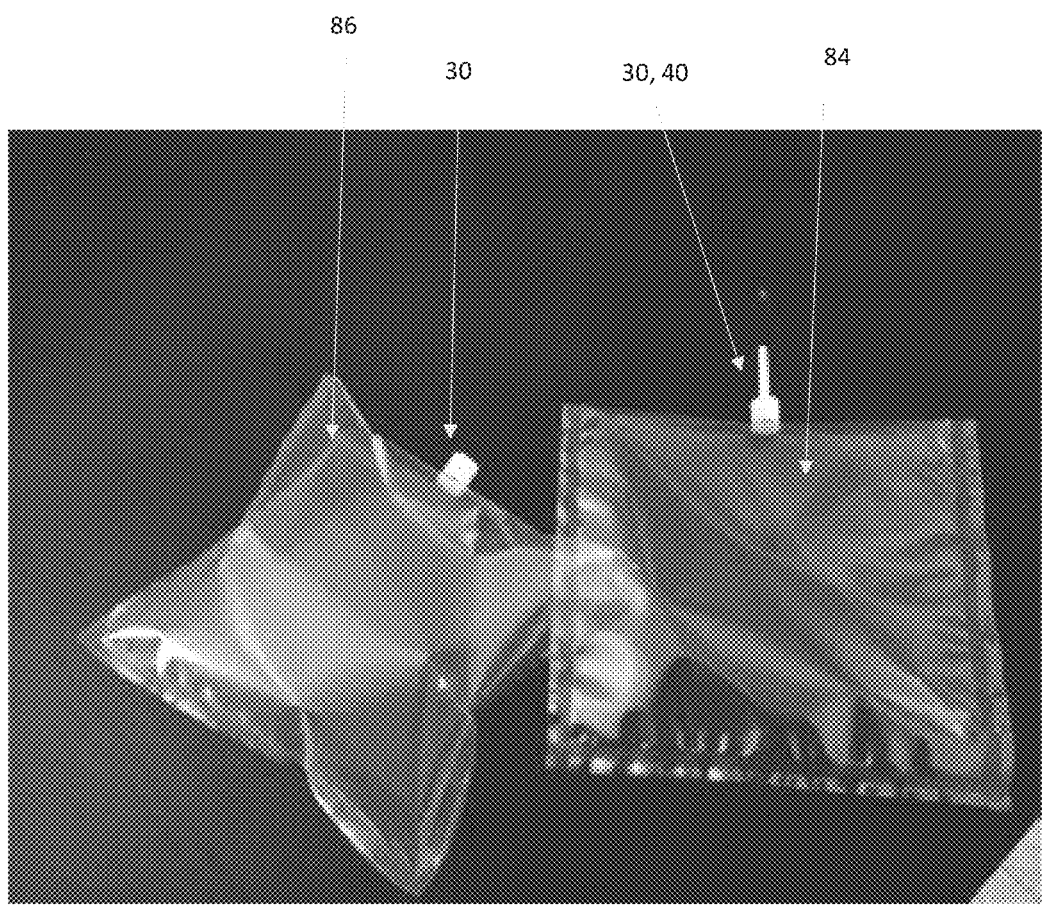
FIG. 17 is a top view of two gas sampling bags with valve-less sampling ports and one sampling adapter.

FIG. 17 is a perspective view of an empty gas sampling bag 84 with the valve-less sampling port 30 and the sampling adapter 40, and a gas sampling bag 86 having a sample within it and the valve-less sampling port 30.

In the first embodiment of the invention, the base member 32, the cap member 34 and the sampling adapter 40 may all be manufactured of the same or different materials. While the preferred material is polypropylene, any suitable material be used that has similar properties, and therefore the first embodiment is not limited to polypropylene. For example, the base member 32, the cap member 34 and the sampling adapter 40 may be manufactured from other polymers, a metal such as stainless steel or from carbonous materials.

The dome seal 36 and the O-ring 38 may be constructed of rubber or rubber-like materials that enable a seal to be formed. While the preferred material is rubber, any suitable material be used that has similar properties, and therefore the first embodiment is not limited to rubber.

The assembly of the valve-less sampling port 30 as well as operation of the device with the sampling adapter 40 are now described herein. The assembling of the valve-less sampling port 30 may begin with making an aperture through one wall of a gas sampling bag 10. The aperture should not be made larger than needed so that there is a tight fit around the base of the base member 32. The base member 32 is disposed inside the gas sampling bag 10 so that the base member is put through the gas sampling bag aperture 44 until it is stopped by the base flange 42. Preferably, the edges of the gas sampling bag aperture 44 are touching or close to touching an outer sidewall of the base member 32. This arrangement ensures that the O-ring 38 will form an airtight seal against the gas sampling bag 10.

The next step is to place the O-ring 38 over the second end 92 of the base member 32 until it is disposed against the gas sampling bag 10 and the base flange 42 that is now underneath a side wall of the gas sampling bag 10. Either before or after the placement of the O-ring, the dome seal 38 may be disposed within the second end 92 of the base member 32.

The user may then place the cap member 34 over the second end 92 of the base member 32 until it forms a tight interference fit, wherein the O-ring 38 is disposed between the cap member and the gas sampling bag 10. The valve-less sampling port 30 is now in place in the gas sampling bag and has created an airtight seal so that no gas may be extracted from the gas sampling bag 10 until the sampling adapter 40 is inserted or a positive pressure is applied to the dome seal 38 by an external pump.

Insertion of the sampling adapter 40 into the valve-less sampling port 30 is performed by pushing the insertion end 72 of the sampling adapter through the cap aperture 68 of the cap member 34 to a first insertion point 80 that does not push through the dome aperture 56 of the dome seal 36. At the first insertion point 80, the sampling adapter does not yet have access to the contents of the gas sampling bag 10. However, a pump may be attached to the sampling adapter and gas inserted into the gas sampling bag.

To gain access to the contents of the gas sampling bag 10 for extraction of gas, the sampling adapter 40 must be further pushed into the valve-less sampling port 30. However, the sampling adapter 40 must first be twisted along its axis until the flange alignment aperture 78 is aligned with the post 70 on top of the cap member 34. It is then possible to push the sampling adapter 40 further into the cap member 34, causing it to slide forward until reaching the second insertion point 82. At the second insertion point 82, the sampling adapter 40 has now pushed through the dome aperture 56, allowing access to the contents of the gas sampling bag 10. It is understood that a user would have attached some tubing to the coupling end 74 of the sampling adapter 40 before the sampling adapter is pushed to the second insertion point 82.

It should be understood that the nature of the valve-less sampling port is that it is bi-directional because it provides a means for inserting gas into a gas sampling bag when the sampling adapter is only inserted into the valve-less sampling adapter to the first insertion point, when positive pressure from a pump will force the dome seal 38 open to allow the insertion of a gas, and it provides a means for gas extraction when the sampling adapter is inserted to a second insertion point and forcing open the dome aperture.

In another aspect of the first embodiment of the invention, it is noted that

In a second embodiment of the invention, the valve-less sampling port may not have an overall cylindrical and therefore a circular cross-section shape. In contrast, valve-less sampling port may have a cross-section that may be a polygon with three or more sides. The change from a cylindrical to a polygonal cross-section with straight sides does not prevent operation of the invention and should not be considered a limiting design choice.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A bi-directional valve-less sampling port for providing access to a gas sampling bag, said valve-less sampling port comprised of:
    a base member comprising a hollow cylinder and having a base flange;
    a dome seal having a dome and adapted to fit within the base member, the dome seal having a normally closed dome aperture;
    a cap member formed having a shape that is adapted to fit over the base member with an open end, thereby holding the dome seal in place and forming an airtight seal within the valve-less sampling port, wherein the cap member includes a cap aperture through a center of a port end opposite the open end, wherein the cap aperture is coaxial with the dome aperture; and
    an O-ring having a toroidal shape, wherein the O-ring is disposed against the open end of the cap member, and wherein the cap member holds the O-ring against an outer surface of the base flange at the first end of the base member.

2. The valve-less sampling port as defined in claim 1 wherein the valve-less sampling port further comprises the base member having a first end at the base flange and a second end opposite the first end, wherein a recessed lip is disposed on an inside diameter of the second end for supporting a circular object on the recessed lip.

3. The valve-less sampling port as defined in claim 2 wherein the valve-less sampling port further comprises the dome seal disposed on the recessed lip of the base member at the second end.

4. The valve-less sampling port as defined in claim 3 wherein the valve-less sampling port further comprises a recessed lip on an inner diameter of the open end of the cap member, wherein the O-ring is disposed against the recessed lip of the cap member so that the cap member may form an airtight seal between the O-ring and the base flange.

5. The valve-less sampling port as defined in claim 4 wherein the valve-less sampling port further comprises at least one channel in the base flange on a bottom surface, wherein the channels are recessed grooves that pass from an exterior to an interior of the base member and along the base flange.

6. The valve-less sampling port as defined in claim 1 wherein the valve-less sampling port further comprises a sampling adapter comprised of a hollow tube having a coupling end and an insertion end and an adapter flange disposed between the coupling end and the insertion end along a length thereof, wherein the insertion end is inserted into the valve-less sampling port at the cap aperture.

7. The valve-less sampling port as defined in claim 6 wherein the valve-less sampling port further comprises:
   a flange alignment aperture disposed through the adapter flange that is coaxial with the sampling adapter; and
   a post on an outside surface of the port end of the cap member and offset from the cap aperture, the post being coaxial with the cap aperture and extending away from cap member.

8. The valve-less sampling port as defined in claim 7 wherein the valve-less sampling port further comprises the coupling end of the sampling adapter having two annular snap joints along a length thereof to define a first insertion point and a second insertion point, the first and second insertion points capable of being held by the cap member and having an airtight seal at the cap aperture.

9. The valve-less sampling port as defined in claim 8 wherein the valve-less sampling port further comprises the base member, the cap member and the sampling adapter being comprised of polypropylene, metal, carbonous materials, or any other material that will enable the valve-less sampling port to function as described.

10. A bi-directional valve-less sampling port for providing access to a gas sampling bag, said valve-less sampling port comprised of:
   a base member comprising a hollow cylinder and having a base flange at a first end, and a second end having a recessed lip on an inside diameter for supporting a circular object on the recessed lip;
   a dome seal having a dome with a circular outer edge, an inner concave surface and an outer convex surface with a dome aperture through a center of the dome, the dome aperture being normally closed unless a force is applied from the inner concave surface towards the outer surface and forming a one-way gate, wherein the outer edge of the dome seal is disposed against and supported by the recessed lip in the second end of the base member, wherein the outer surface of the dome seal is directed from the second end towards the first end of the base member;
   a cap member formed having a cylindrical shape with a port end and an open end and formed so as to fit over the second end of the base member, thereby holding the dome seal in place in the second end of the base member, wherein the cap member includes a recessed lip on an inner diameter of the open end, and includes a cap aperture through a center of the port end that is coaxial with the dome aperture; and
   an O-ring having a toroidal shape, wherein the O-ring is disposed within the recessed lip of the cap member, wherein the cap member holds the O-ring against an outer surface of the base flange at the first end of the base member.

11. A method for using a bi-directional valve-less sampling port for obtaining access to a gas sampling bag, said method comprising:
   providing a valve-less sampling port including a base member, an O-ring, a cap member and a dome seal, wherein the base member is comprised of a hollow cylinder having a base flange, providing the dome seal having a dome adapted to fit within the base member, the dome seal having a normally closed dome aperture, providing the cap member formed having a shape that is adapted to fit over the base member with an open end, thereby holding the dome seal in place and forming an airtight seal within the valve-less sampling port, wherein the cap member includes a cap aperture through a center of a port end opposite the open end, wherein the cap aperture is coaxial with the dome aperture, and providing the O-ring having a toroidal shape, wherein the O-ring is disposed against the open end of the cap member, and wherein the cap member holds the O-ring against an outer surface of the base flange at the first end of the base member;
   making an aperture through one wall of a gas sampling bag;
   placing the base member inside a gas sampling bag such that the base member is disposed through the aperture with the base flange inside the gas sampling bag and a body of the base member extending outwards from the gas sampling bag, wherein the edges of the aperture of the gas sampling bag are touching an outer sidewall of the base member;
   disposing the O-ring over the base member until it is disposed against the gas sampling bag and the base flange underneath the gas sampling bag, and disposing the dome seal on a second end of the base member so that the dome seal is disposed within the base member; and
   disposing the cap member over the second end of the base member until it forms an interference fit, wherein the O-ring is disposed between the cap member and the gas sampling bag and creating an airtight seal within the valve-less sampling port.

12. The method as defined in claim 11 wherein the method further comprises providing a sampling adapter comprised of a hollow tube and having a coupling end and an insertion end and an adapter flange that is perpendicular to and located between the coupling end and the sampling end along a length thereof.

13. The method as defined in claim 12 wherein the method further comprises inserting the insertion end of the sampling adapter through the cap aperture of the cap member to a first insertion point that does not push through the dome aperture.

14. The method as defined in claim 13 wherein the method further comprises:
   providing a flange alignment aperture disposed through the adapter flange that is coaxial with the sampling adapter;
   providing a post on an outside surface of the port end of the cap member and offset from the cap aperture, the post being coaxial with the cap aperture and extending away from cap member;
   rotating the sampling adapter until the flange alignment aperture is aligned with the post; and pushing the sampling adapter further into the cap member from the first insertion point to a second insertion point wherein the insertion end pushes through the dome aperture of the dome seal to thereby obtain access to contents of a gas sampling bag.

15. The method as defined in claim 14 wherein the method further comprises the step of providing access to the contents of the gas sampling bag using a valve-less sampling port that has no moving parts but only flexing parts of the dome seal.

* * * * *